United States Patent
Jang et al.

(10) Patent No.: US 7,668,131 B2
(45) Date of Patent: *Feb. 23, 2010

(54) METHOD FOR ALLOCATING TRANSMISSION PERIOD IN A WIRELESS COMMUNICATION SYSTEM

(75) Inventors: Kyung-Hun Jang, Suwon-si (KR); Jong-Ae Park, Yongin-si (KR); Dong-Jun Lee, Seoul (KR); Young-Soo Kim, Seoul (KR); Hyo-Sun Hwang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 467 days.

This patent is subject to a terminal disclaimer.

(21) Appl. No.: 11/582,005

(22) Filed: Oct. 17, 2006

(65) Prior Publication Data

US 2007/0115971 A1    May 24, 2007

Related U.S. Application Data

(60) Provisional application No. 60/727,915, filed on Oct. 18, 2005, provisional application No. 60/730,924, filed on Oct. 27, 2005.

(30) Foreign Application Priority Data

Jun. 9, 2006    (KR) ...................... 10-2006-0051940

(51) Int. Cl.
    *G08C 17/00*    (2006.01)
(52) U.S. Cl. ........................ 370/311; 370/318; 370/328; 370/338; 370/329; 370/341; 455/574; 455/522
(58) Field of Classification Search ................ 455/458, 455/574, 450–454, 509–517, 522, 69; 370/311, 370/318, 328, 338, 329, 341
    See application file for complete search history.

(56) References Cited

U.S. PATENT DOCUMENTS

5,384,777 A * 1/1995 Ahmadi et al. .............. 370/337

(Continued)

FOREIGN PATENT DOCUMENTS

| EP | 1 193 909 | 4/2002 |
|---|---|---|
| EP | 1 193 909 A2 | 4/2002 |
| JP | 2002-271340 | 9/2002 |
| WO | WO 2006/134472 | 12/2006 |

OTHER PUBLICATIONS

IEEE 802.11-04-0918-00-000n, Jang et al., Samsung MAC Proposal Technical Specification, pp. 1-37, Revision D4.0, dated Aug. 13, 2004, XP-002420421, I.E.E.E.

(Continued)

*Primary Examiner*—Kamran Afshar
*Assistant Examiner*—Marisol Fahnert
(74) *Attorney, Agent, or Firm*—NSIP Law

(57) ABSTRACT

A method is provided for efficiently allocating a transmission period in a wireless network system. An access point (AP) transmits a PSMP frame indicating a downlink period provided to each station (STA) and a minimum amount of an uplink period allocated to each STA, and at least one sub PSMP frame indicating an uplink period additionally provided for an STA that transmitted a resource request message for remaining queued data in the uplink period indicated by the PSMP frame. If the uplink period indicated by the PSMP frame is insufficient to transmit the queued data, the STA transmits a data unit including a part of the queued data and a resource request message for the remaining queued data in the uplink period. After transmitting the resource request message, the STA receives the sub PSMP frame after the full period indicated by the sub PSMP frame, and transmits the remaining queued data to the AP in the uplink period indicted by the sub PSMP frame.

17 Claims, 8 Drawing Sheets

U.S. PATENT DOCUMENTS

| | | | |
|---|---|---|---|
| 5,648,955 A * | 7/1997 | Jensen et al. | 370/252 |
| 6,141,336 A | 10/2000 | Bauchot et al. | |
| 7,043,477 B2 * | 5/2006 | Mercer et al. | 707/7 |
| 2003/0048765 A1 | 3/2003 | Jang | |
| 2004/0213197 A1 | 10/2004 | Zimmerman et al. | |
| 2004/0223455 A1 * | 11/2004 | Fong et al. | 370/229 |
| 2005/0018624 A1 * | 1/2005 | Meier et al. | 370/318 |
| 2005/0135302 A1 * | 6/2005 | Wang et al. | 370/329 |
| 2006/0165036 A1 * | 7/2006 | Chandra et al. | 370/329 |
| 2006/0203765 A1 * | 9/2006 | Laroia et al. | 370/328 |
| 2006/0285517 A1 * | 12/2006 | Kakani | 370/329 |

OTHER PUBLICATIONS

Kyunghun Jang et al., Samsung MAC Proposal Technical Specification, Aug. 13, 2004.

U.S. Appl. No. 11/582,757, filed Oct. 2006, Jang et al.
U.S. Appl. No. 11/582,495, filed Oct. 2006, Jang et al.
U.S. Appl. No. 11/581,941, filed Oct. 2006, Jang et al.
U.S. Appl. No. 11/581,283, filed Oct. 2006, Jang et al.
U.S. Appl. No. 11/581,279, filed Oct. 2006, Jang et al.
U.S. Appl. No. 11/581,671, filed Oct. 2006, Jang et al.
U.S. Appl. No. 11/582,171, filed Oct. 2006, Jang et al.
U.S. Appl. No. 11/582,723, filed Oct. 2006, Jang et al.
U.S. Appl. No. 11/582,918, filed Oct. 2006, Jang et al.
U.S. Appl. No. 11/581,913, filed Oct. 2006, Jang et al.
U.S. Appl. No. 11/582,692, filed Oct. 2006, Jang et al.
U.S. Appl. No. 11/582,169, filed Oct. 2006, Jang et al.
U.S. Appl. No. 11/582,759, filed Oct. 2006, Jang et al.
U.S. Appl. No. 11/581,496, filed Oct. 2006, Jang et al.

* cited by examiner

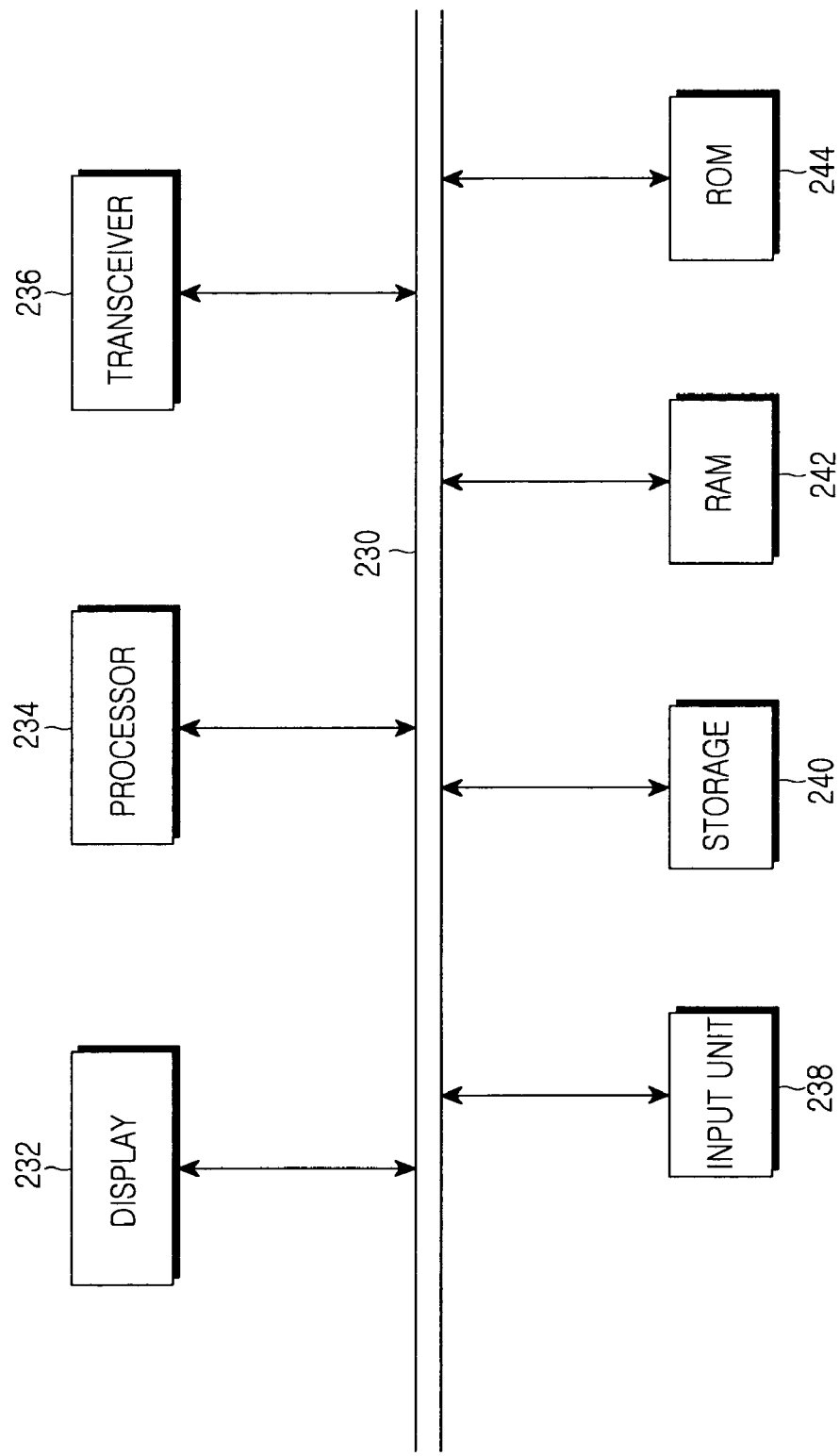

METHOD FOR ALLOCATING TRANSMISSION PERIOD IN A WIRELESS COMMUNICATION SYSTEM

PRIORITY

This application claims the benefit under 35 U.S.C. §119(a) of an application entitled "Phase Resource Allocation Method" filed in the United States Patent and Trademark Office on Oct. 18, 2005 and assigned Ser. No. 60/727,915, an application entitled "Multi-Phase Resource Allocation Method" filed in the United States Patent and Trademark Office on Oct. 27, 2005 and assigned Ser. No. 60/730,924, and application entitled "Method and Apparatus for Allocating Transmission Period in a Wireless Communication System, and System Therefor" filed in the Korea Intellectual Property Office on Jun. 9, 2006 and assigned Serial No. 2006-51940, the entire contents of all of which are incorporated herein by reference.

BACKGROUND OF THE INVENTION

1. Field of the Invention

The present invention relates to a method for efficiently allocating a transmission period in a transmission frame period of a wireless network system.

2. Description of the Related Art

Along with the recent development of wireless communication technology and the resulting spread of wireless equipment, there is an increasing demand for high-speed, highly reliable data transmission via a wireless link. A Wireless Local Area Network (WLAN) developed to meet the demand is basically composed of stations (STAs), which are mobile data communication equipment, and an access point (AP) capable of exchanging data with the STAs. The AP and the STAs, located in the same wireless service coverage, are known as a Base Service Set (BSS).

Particularly, an improved WLAN system achieves high throughput by employing a Multiple Input Multiple Output (MIMO) technology that uses a plurality of transmission antennas and a plurality of reception antennas, and an Orthogonal Frequency Division Multiplexing (OFDM) technology. In this WLAN system, STAs located in one wireless service coverage area transmit or receive data using wireless resources allocated from an AP. In this case, the AP allocates the wireless resources in the form of phase resources, and the term "phase resources" as used herein refers to a period in which the STAs or AP can transmit data.

FIG. 1 illustrates a structure of a transmission frame period in a typical WLAN system.

Referring to FIG. 1, in a transmission frame period 100 having a fixed length determined in the system, an AP transmits a MAP (mapping) frame 110 indicating the phase resource allocation over the full transmission frame period 100. The MAP frame 110 is composed of a downlink MAP 120 indicating a period in which the AP can transmit data, and an uplink MAP 122 indicating a period in which the STAs can transmit data. The downlink MAP 120 is composed of a Number-of-STAs field 130, and at least one STA Information field 132 determined based on the Number-of-STAs field 130. Similarly, the uplink MAP 122 is composed of a Number-of-STAs field 134, and at least one STA Information field 136 determined based on the Number-of-STAs field 134. The STA Information fields 132 and 136 include STA ID fields 140 and 144 that indicate STAs allocated downlink and uplink periods, respectively, and Time Offset fields 142 and 146 that indicate time offsets allocated to the STAs.

An STA, allocated a period in the MAP frame 110, receives data in a period indicated by the corresponding STA information, of a downlink period 112, and transmits data in a period indicated by corresponding STA information, of an uplink period 114. The STA maintains a sleep mode in the other periods except for the period in which the MAP frame 110 is transmitted and the period indicated by the MAP frame 110. A contention period 116 following the uplink period 114 can be accessed by at least one STA on a contention basis.

In this way, the AP estimates the amount of resources required for each STA in one transmission frame period 100, and allocates downlink and uplink periods according to the estimation. However, when the AP overestimated the amount of resources required for the STA, the wireless resources are wasted, decreasing data throughput performance. In this case, the STA may not use the allocated wireless resources. Moreover that resource cannot be reused by other STAs since that resource is already allocated to the particular STA. When the AP underestimates the amount of resources required for the STA, the STA cannot be allocated its required resources until at least the next transmission frame period, suffering transmission delay and jitter of the uplink service. The transmission delay and jitter affects a Quality of Service (QoS) required by the STA. In addition, if the STA accesses the contention period 116 due to a lack of its allocated resources, the STA cannot operate in the sleep mode for the contention period, wasting its power.

Therefore, in the wireless communication system in which the AP determines the downlink and uplink periods required for the STA through scheduling, there is a need for technology to prevent the reduction in data throughput and the waste of STA power, and accurately allocate the periods.

SUMMARY OF THE INVENTION

To substantially solve at least the above problems and/or disadvantages and to provide at least the advantages below, the present invention provides a transmission period allocation method for minimizing a waste of STA power without reducing data throughput in a wireless network system.

The present invention provides a method for flexibly allocating a transmission period required for an STA using more than two MAP frames in a wireless network system.

The present invention provides a method for, after allocating a transmission period to an STA using a MAP frame, allocating an accurate transmission period to the STA using an additional MAP frame in the same transmission frame period at a request of the STA in a wireless network system.

According to one aspect of the present invention, there is provided a method for allocating a transmission period in a wireless network system. The method includes transmitting a power save multi-poll (PSMP) frame providing a downlink period and an initial uplink period to at least one station (STA); receiving data by the at least one STA in the downlink period provided by the PSMP frame and transmitting data by the at least one STA in the initial uplink period provided by the PSMP frame; upon detecting a resource request message from at least one STA requesting allocation of additional resources required for the transmission of remaining queued uplink data, and after the downlink period and the initial uplink period provided by the PSMP frame, transmitting in the transmission frame period a sub PSMP frame providing an additional uplink period sufficient to transmit at least part of the remaining queued uplink data; and receiving in the additional uplink period provided by the sub PSMP frame the at least part of the remaining queued uplink data from the at least one STA that transmitted the resource request message.

BRIEF DESCRIPTION OF THE DRAWINGS

The above and other objects, features and advantages of the present invention will become more apparent from the following detailed description when taken in conjunction with the accompanying drawings in which:

FIG. 2B is a block diagram illustrating an exemplary structure of an AP and each STA in the WLAN system shown in FIG. 2A;

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

A main feature of the present invention, related to allocation of transmission periods in a wireless network system, is to provide more than one MAP (mapping) frames to indicate a period allocated by an access point (AP) to each station (STA) in a transmission frame period. The allocated period starts immediately after the MAP frame is transmitted, and in the transmission frame period, the MAP frames other than the first MAP frame are referred to as "subsequent MAPs" (sub MAPs). In particular, the wireless communication system according to the present invention, after allocating a minimum period to an STA using a MAP frame, allocates accurate resources to the STA using a sub MAP frame in the same transmission frame period and at the request of the STA.

Although a detailed description of the present invention will be made with reference to a Wireless Local Area Network (WLAN) system based on IEEE 802.11 standards, it will be understood by those skilled in the art that allocation of phase resources, an aspect of the present invention, can also be applied to other wireless communication systems having the similar technical requirements and channel formats without departing from the spirit and scope of the invention.

Figure 1:
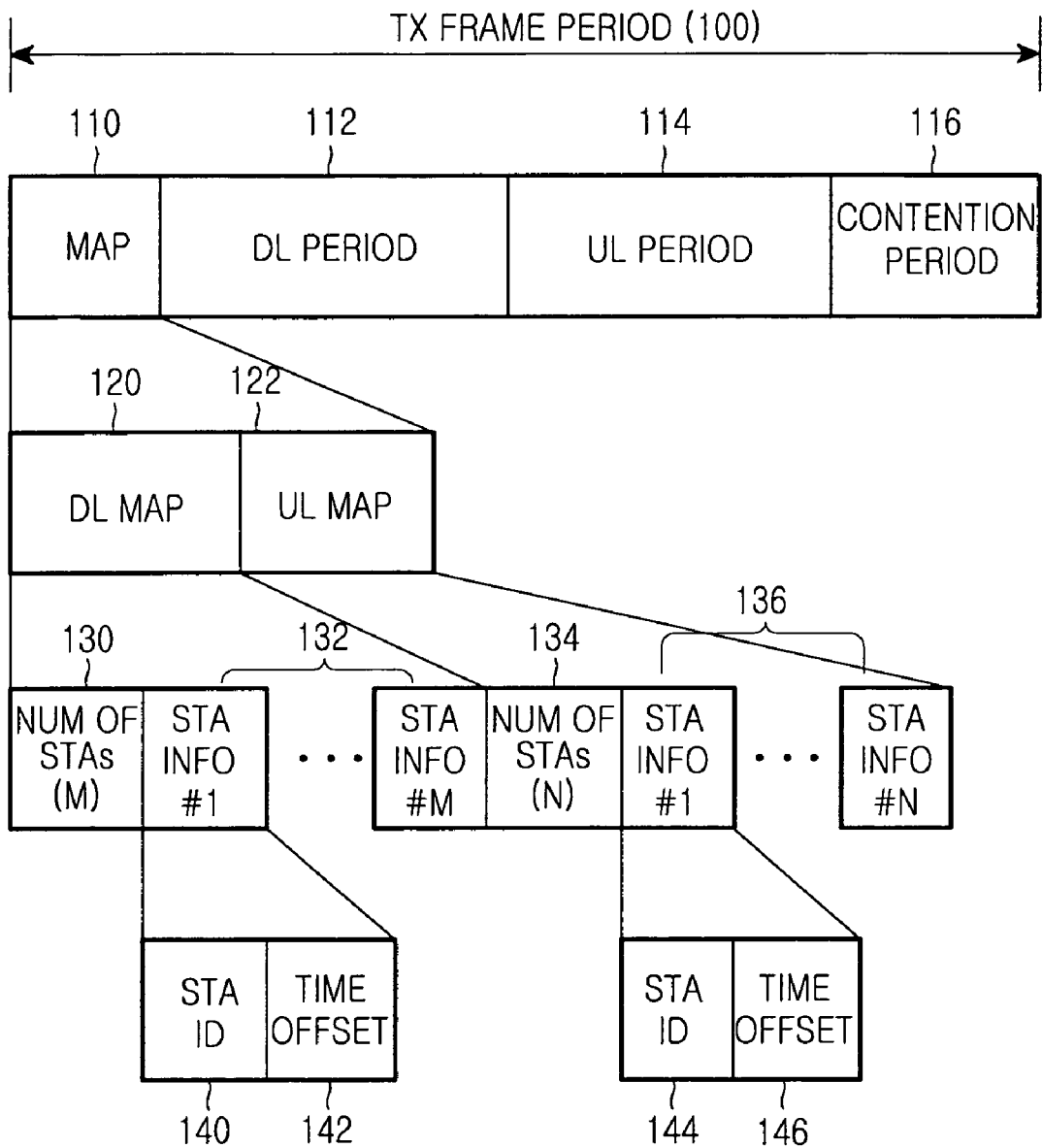
FIG. 1 is a diagram illustrating a structure of a transmission frame period in a typical WLAN system.
Figure 2A:
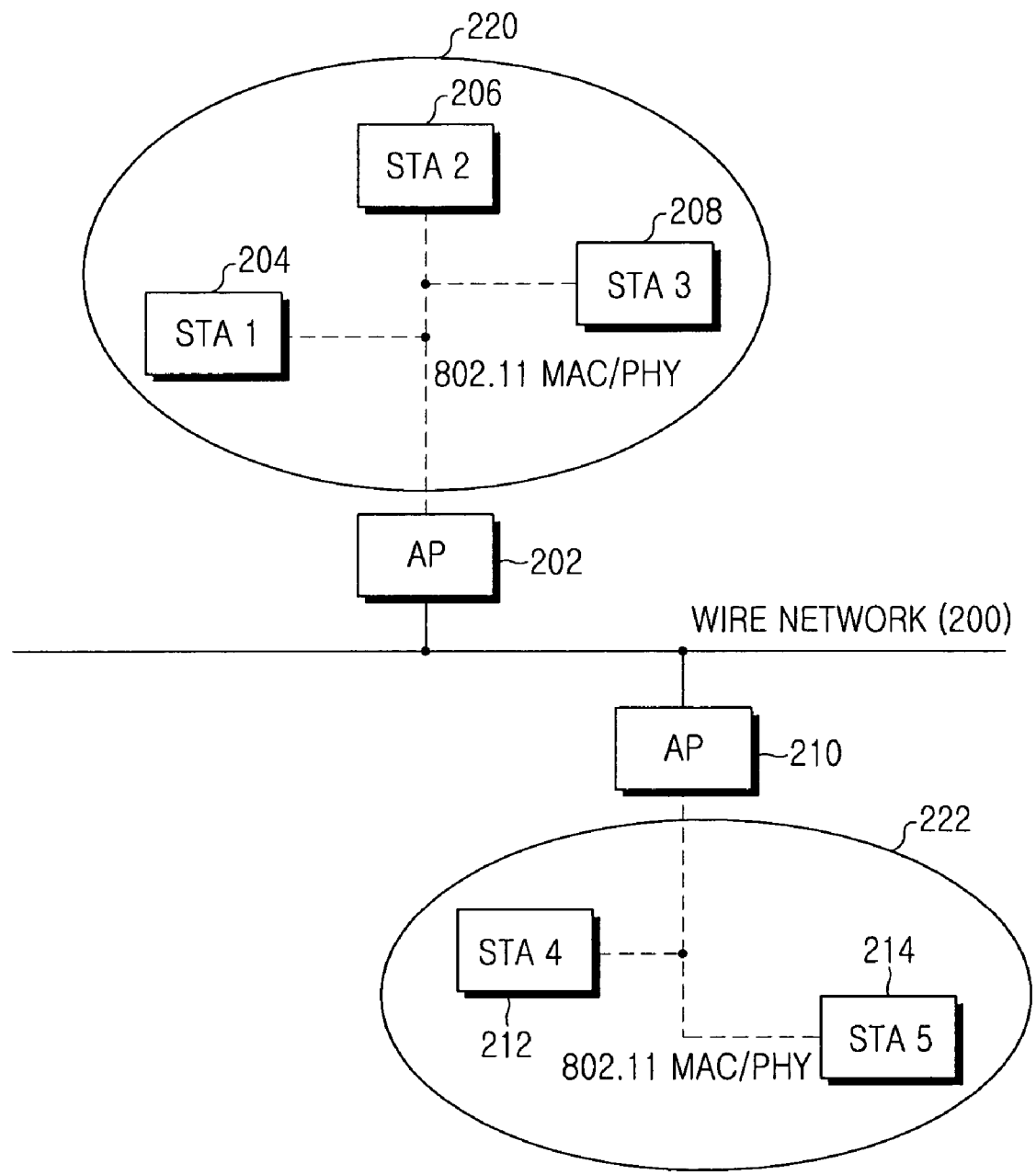
FIG. 2A is a diagram illustrating a configuration of a WLAN system according to the present invention.

FIG. 2A illustrates a configuration of a WLAN system according to the present invention.

Referring to FIG. 2A, each of APs 202 and 210 is connected to a wire network 200, and a plurality of STAs 204, 206, 208, 212 and 214 access their associated APs 202 and 210 via an IEEE 802.11 Physical (PHY) layer and a wireless link based on a Media Access Control (MAC) protocol, and transmit/receive data over a plurality of wireless channels. The STAs 204 to 208 and the AP 202, located in the same wireless service coverage 220, constitute one Base Service Set (BSS). In the same way, the STAs 212 and 214 and the AP 210, located in the wireless service coverage 222, form another BSS. STAs located in each BSS can exchange data with each other via a corresponding AP. The key functions of the APs 202 and 210 include delivery of data traffic, access to other networks (e.g. wire network 200), roaming support, synchronization in a BSS, power management support, and control of media access for supporting time-bound service in a BSS.

FIG. 2B is a block diagram illustrating an exemplary structure of an AP and each STA in the WLAN system shown in FIG. 2A. Both the AP and the STA can include a display 232, a processor 234, a transceiver 236, an input unit 238, a storage 240, a Random Access Memory (RAM) 242, a Read Only Memory (ROM) 244, and a common bus 230. The illustrated exemplary structure is merely provided for convenience. Although specific elements and their operations as an AP or an STA will be described herein with reference to FIG. 2B, the exemplary description should not limit the present invention.

Referring to FIG. 2B, the transceiver 236, connected to an antenna (not shown), receives desired data and converts the received signal into corresponding digital data. The processor 234 is a controller operating under the control of an operating system (OS) and other programs, included in the ROM 244, and the data and information generated by an operation of the processor 234 are stored in the RAM 242.

The key operations of the processor 234 included in the AP include generation/analysis of data, allocation of periods for the STAs located in the same wireless service coverage area and connected to the AP, generation of at least one MAP frame indicating the allocated period, and operation mode control for the transceiver 236 based on the allocated period. Specifically, the processor 234 of the AP allocates the minimum data rate of each STA or the minimum amount of resources to the STAs through the MAP frame located in the foremost part of a transmission frame, and if there is any STA that will send a Resource Request (RR) message through the allocated resources, the processor 234 additionally allocates the requested amount of uplink period to the STA that sent the RR message, through the sub MAP frame transmitted immediately after a sequence duration associated with the first MAP frame of the transmission frame. It would be obvious to those skilled in the art that the term "immediately after" substantially refers to a lapse of a predetermined time.

After expiration of the downlink/uplink period indicated by the first MAP frame, if necessary, more than one sub MAP frames indicating the downlink and/or uplink periods allocated in the same transmission frame period can be additionally transmitted. The sub MAP frame is followed by the downlink and/or uplink periods indicated by the sub MAP frame.

The key operations of the processor 234 included in the STA include generation/analysis of data, generation of a transmission frame, and operation mode control for the transceiver 236 based on a MAP frame received from the start point of the transmission frame. That is, the processor 234 controls the transceiver 236 such that it receives the MAP frame from the AP at the start point of every transmission frame, and analyzes the MAP frame to determine whether its own STA ID is included therein. If its own STA ID is included in the MAP frame, the processor 234 stores in the storage 240 information on the allocated downlink and uplink periods indicated by the STA information associated with the STA ID, and then wakes up the receiver and the transmitter of the transceiver 236 in the respective downlink and uplink periods so as to receive/transmit the data. The receiver and the transmitter of the transceiver 236 enter the sleep mode in the other periods except for the allocated periods.

In particular, if the resource allocated by the AP is not enough to transmit the queued data, the processor 234 of the STA transmits a part of the queued data using the allocated uplink resource. At the same time, the processor 234 generates an RR message for requesting additional resources, and sends the RR message to the AP via the transceiver 236. After sending the RR message, the processor 234 monitors whether a sub MAP frame indicating the additionally allocated resources is received from the AP after expiration of the initial uplink and downlink periods indicated by the MAP frame, and upon receipt of the sub MAP frame, analyzes the received sub MAP frame.

Figure 3:
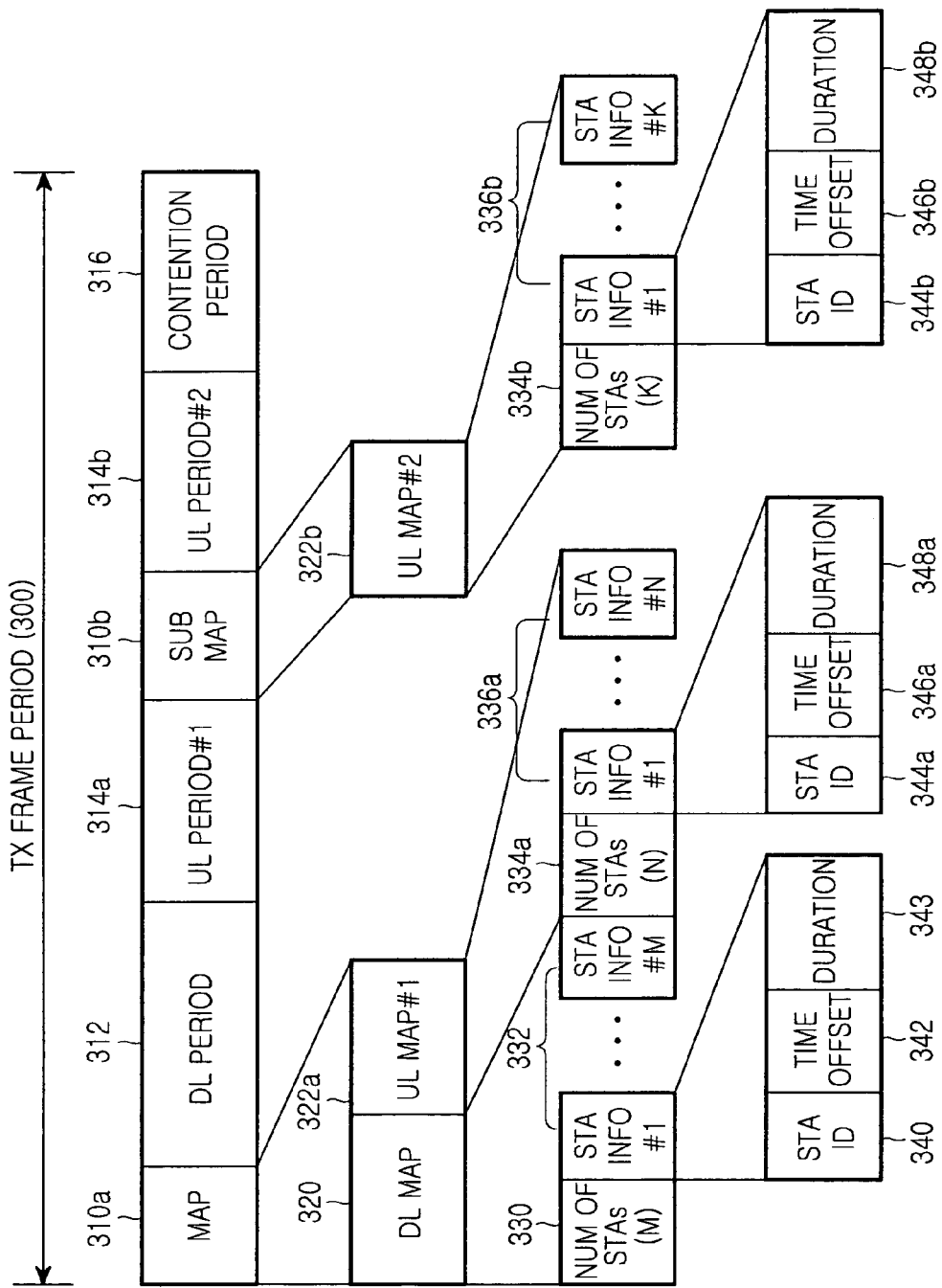
FIG. 3 is a diagram illustrating a structure of a transmission frame period according to the present invention.

FIG. 3 illustrates a structure of a transmission frame period according to the present invention. Although it is illustrated herein that frames and uplink/downlink periods are adjacent, intervals for transmission/reception switching and processing may exist in the actual system.

Referring to FIG. 3, in a transmission frame period 300 having a fixed length, an AP first transmits a MAP frame 310a with a basic rate set (including modulation scheme, coding rate, and data rate), which is less than a normal rate set. This is to enable all STAs in the service coverage area to receive the MAP frame 310a. At the start of communication, the MAP frame 310a is periodically transmitted according to a fixed period (for example, about 20 ms and 100 ms for Voice over Internet Protocol (VoIP) and Moving Picture Experts Group 4 (MPEG4), respectively) determined through negotiation between the AP and the STA. The transmission frame period 300 is initialized by the transmission of the MAP frame 310a.

For example, the MAP frame 310a, in order to indicate phase resource allocation of its succeeding downlink period 312 and first uplink period 314a, is composed of a downlink MAP 320 indicating a period in which the AP can transmit data in the downlink period 312, and a first uplink MAP 322a indicating a period in which the STA can transmit data in the first uplink period 314a. The downlink MAP 320 is composed of a Number-of-STAs field 330 and at least one STA Information field 332 determined based on the Number-of-STAs field 330. In the same way, the first uplink MAP 322a is composed of a Number-of-STAs field 334a and at least one STA Information field 336a determined based on the Number-of-STAs field 334a.

The STA Information fields 332 and 336a each include STA ID fields 340 and 344a that indicate STAs allocated or provided the periods in the downlink period 312 and the first uplink period 314a, Time Offset fields 342 and 346a that indicate starts of the periods allocated to the STAs, and Duration fields 343 and 348a that indicate lengths of the allocated periods. The STA ID fields 340 and 344a each include at least a part of an Association Identity (AID) of each STA, or at least a part of a hardware address, i.e. MAC address, given to each STA. An STA ID that indicates a period for broadcast/multicast data is set to a particular value, for example, '0'. The Time Offset fields 342 and 346a each indicate an interval from the MAP frame 310a until a start of a corresponding period in a multiple of a predetermined unit of time (for example, 4 µs). The Duration fields 343 and 348a each indicate an interval from a start to an end of the period, i.e. indicate a length of the period in a multiple of a predetermined unit of time (for example, 16 µs).

The first uplink MAP 322a of the MAP frame 310a is determined according to the minimum amount of resources $R_{init}$ estimated for each STA. The $R_{init}$ indicates the minimum data rate for individual service joined by the STA, or the resource required for transmission of a control message. The RR message used for requesting additional resource allocation is a typical example of the control message. If the minimum data rate for individual service is determined during service access setup, the amount of resources required for transmission of the control message is determined based on a length of the control message. As a result, the first uplink period 314a indicated by the first uplink MAP 322a is minimized in the transmission frame period 300.

The STA, allocated phase resources by the MAP frame 310a, receives data in the period indicated by the corresponding STA information 332, in the downlink period 312, and transmits data in the period indicated by the corresponding STA information 336a, in the first uplink period 314a. The downlink and uplink data can include MPDUs including one or more Aggregate MAC Protocol Data Unit (PDU) (A-MPDU) and/or payload, and an Acknowledgement. The STA maintains the sleep mode in the period where the MAP frame 310a is transmitted, and the other periods except for the periods indicated by the MAP frame 310a.

When transmitting data in the allocated period of the first uplink period 314a, each STA determines whether the allocated period is sufficient to transmit the data queued therein. If the allocated period is not sufficient, the STA transmits only a part of the queued data in the allocated period, and then sends an RR message. In this case, a part of the queued data is transmitted using a $(R_{init}-R_{RR})$ resource in the allocated period, where $R_{RR}$ indicates the resource used for transmission of the RR message. The RR message is set up with a Queue Size field of the queued data, or a Duration Request field based on QoS, and can be composed of one A-MPDU together with the data transmitted in the allocated period. In other words, the RR message is piggybacked on the data.

The AP can allocate an accurate uplink period based on the RR message from the STA by transmitting a sub MAP frame 310b. In this way, transmission of the remaining queued data is permitted. Immediately after transmitting the RR message in the first uplink period 314a, the STA monitors receipt of the sub MAP frame 310b. The sub Map frame 310b indicates the uplink resources additionally allocated by the AP in response to the RR message.

That is, the sub MAP frame 310b includes a second uplink MAP 322b indicating phase resource allocation for a second uplink period 314b. Similarly, the sub MAP frame 310b can be transmitted with the basic rate set. The second uplink MAP 322b is composed of a Number-of-STAs field 334b and at least one STA Information field 336b determined based on the Number-of-STAs field 334b. The STA Information field 336b includes an STA ID field 344b that indicates an STA allocated a period in the second uplink period 314b, a Time Offset field 346b that indicates a start of the period allocated to the STA, and a Duration field 348b that indicates a length of the period. The elements of the STA Information field 336b have been described above. An STA, allocated phase resources by the sub MAP frame 310b, receives data in the period indicated by the corresponding STA information 336b, of the second uplink period 314b.

Although not illustrated, if there is a need for still further additional resource allocation, more than one sub MAP frames and an uplink period or a downlink period based on the sub MAP frames can be additionally included in the transmission frame period 300. A transmission scheme using a MAP frame capable of accompanying one or more sub frames is referred to as a Multi-Phase "Power Save Multi-Poll" (PSMP), and the MAP frame 310a and the sub MAP frame 310b are referred to as a PSMP frame and a sub PSMP frame, respectively. Each of the PSMP frame and the sub PSMP frame is followed by at least one downlink or uplink period indicated by the corresponding (sub) PSMP frame, and one (sub) PSMP frame and a corresponding indicated period are called a (sub) PSMP sequence. In other words, one PSMP sequence is initialized by transmitting the PSMP frame, and the STA wakes up only in the period indicated by the PSMP frame in the PSMP sequence starting with the PSMP frame, thereby minimizing power consumption.

A contention period 316 following the last sequence duration can be accessed by at least one STA on a contention basis.

It should be noted that the elements of the MAP frames 310a and 310b shown in FIG. 3 and their arrangements are subject to change without departing from the spirit and scope of the invention. For example, each of the MAP frames 310a and 310b includes one STA ID field, Time Offset and Duration fields for downlink transmission, and Time Offset and Duration fields for uplink transmission. In this case, if no period is allocated to the uplink or downlink, a corresponding Duration field is set to Null (0). In addition, each of the MAP frames 310a and 310b can include a field for indicating whether it will be followed by another sub MAP frame. The STA analyzes the field in the sub MAP frame to determine whether the sub MAP frame is the last sub MAP frame in the current transmission frame period.

Figure 4:
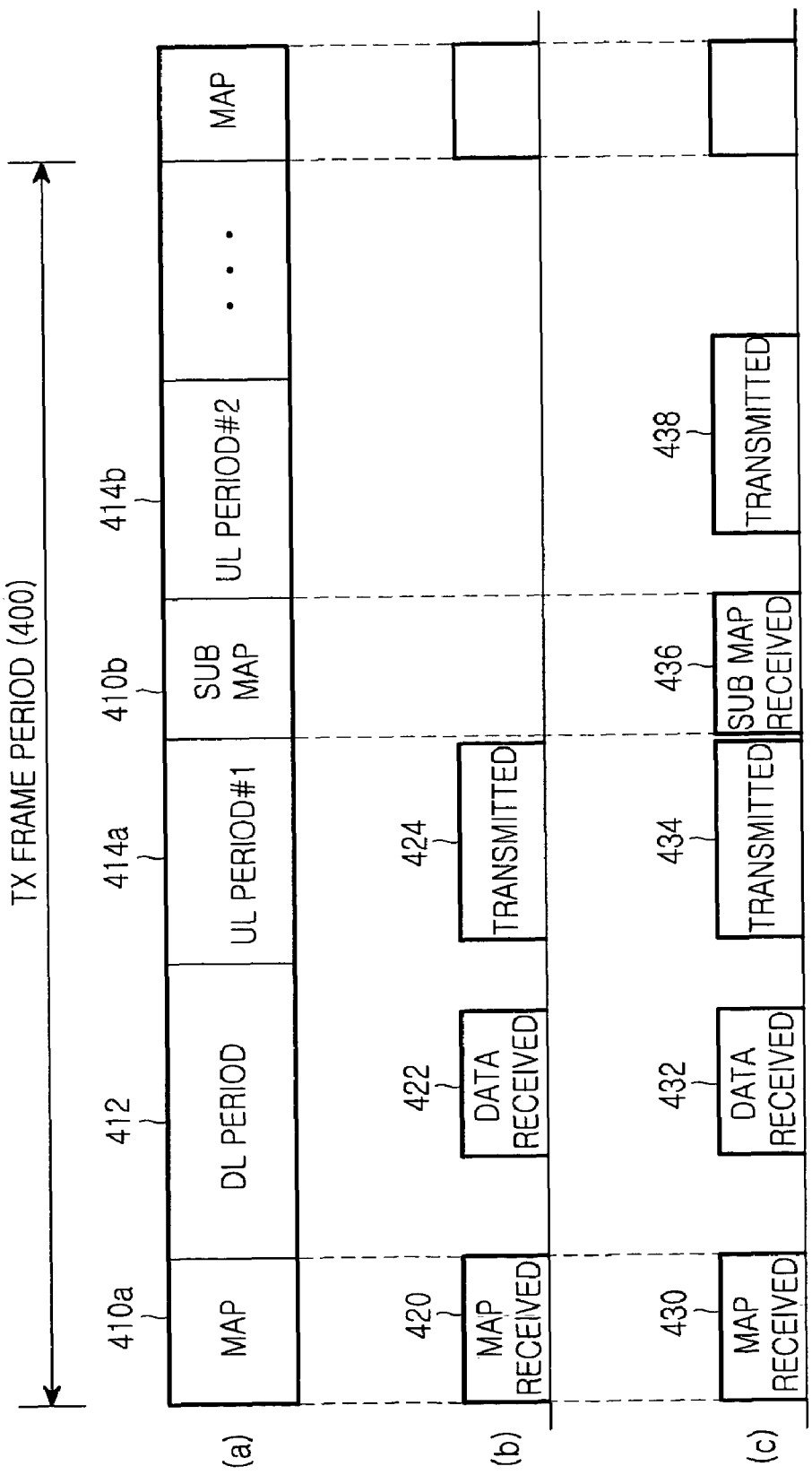
FIG. 4 is a timing diagram for a description of a power reduction effect of the phase resource allocation according to the present invention.

FIG. 4 is a timing diagram for a description of a power reduction effect of the phase resource allocation according to the present invention.

Referring to diagram (a) of FIG. 4, a transmission frame period 400 includes a MAP frame 410a, a downlink period 412, a first uplink period 414a, a sub MAP frame 410b, and a second uplink period. The MAP frame 410a indicates phase resource allocation of the downlink period 412 and the first uplink period 414a.

Diagram (b) of FIG. 4 shows a scenario in which the resources of the first uplink period 414a allocated based on the MAP frame 410a are enough to transmit the data queued an STA. That is, after switching to the sleep mode after receipt of the MAP frame 410a in a period 420, the STA wakes up in an allocated period 422 in the downlink period 412 indicated by the MAP frame 410a and receives data from the AP. After switching back to the sleep mode upon expiration of the period 422, the STA holds the sleep mode until an allocated period 424 in the first uplink period 414a indicated by the MAP frame 410a. In the period 424, the STA transmits data to the AP. Here, the STA, as it has fully transmitted the queued data in the period 424, maintains the sleep mode until it receives a MAP frame of the next transmission frame period, without monitoring receipt of the sub MAP frame 410b.

Diagram (c) of FIG. 4 shows a scenario in which the resource of the first uplink period 414a allocated based on the MAP frame 410a is not sufficient to transmit the data desired by the STA. That is, after switching to the sleep mode after receipt of the MAP frame 410a in a period 430, the STA wakes up in an allocated period 432 in the downlink period 412 indicated by the MAP frame 410a, and receives data from the AP. After switching back to the sleep mode upon expiration of the period 432, the STA maintains the sleep mode until an allocated period 434 in the first uplink period 414a indicated by the MAP frame 410a. In the period 434, the STA transmits data to the AP. At the same time, the STA transmits an RR message for requesting the resources required for transmission of the remaining queued data, along with a part of the queued data, in the period 434.

After transmitting the RR message, the STA wakes up in a period 436 and monitors receipt of the sub MAP frame 410b. Upon receipt of the sub MAP frame 410, the STA switches back to the sleep mode and waits until period 438 in a second uplink period 414b indicated by the sub MAP frame 410b. In the period 438, the STA transmits the remaining queued data to the AP. Although not illustrated, it is possible to allocate further periods mapped to one or more additional MAP frames before the expiration of the transmission frame period 400.

Figure 5:
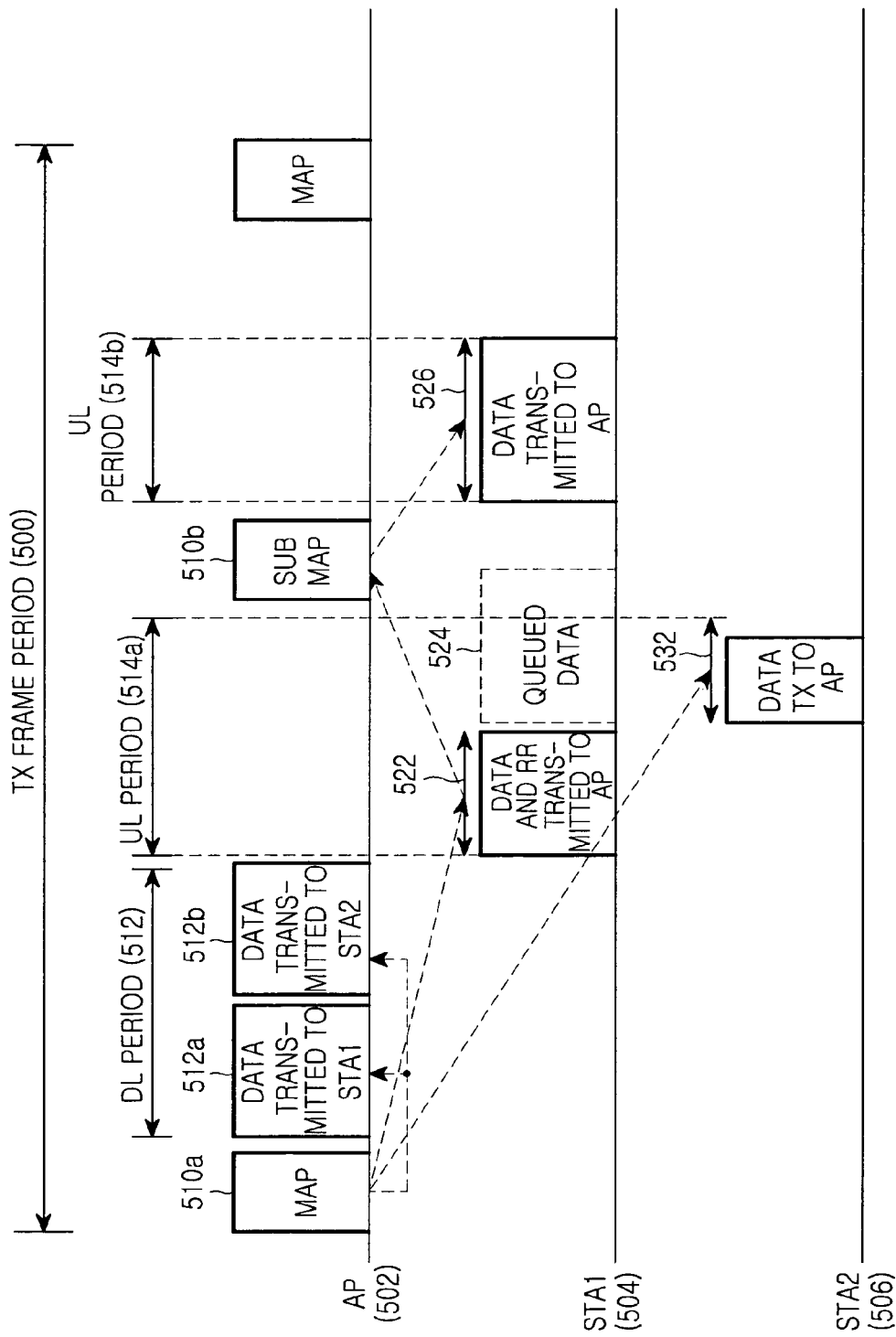
FIG. 5 is a diagram illustrating exemplary accurate resource allocation according to the present invention.

FIG. 5 illustrates exemplary accurate resource allocation according to the present invention. Herein, two STAs (STA1) 504 and (STA2) 506 are communicating with each other in a service coverage area of an AP 502.

Referring to FIG. 5, the AP 502 transmits a MAP frame 510a at the start of a transmission frame period. The MAP frame 510a indicates periods 512a and 512b in a downlink period 512 allocated to the STA1 504 and the STA2 506, and periods 522 and 532 in an uplink period 514a allocated to the STA1 504 and the STA2 506. Herein, the periods 512a, 512b, 522 and 532 do not overlap each other. After transmitting the MAP frame 510a, the AP 502 transmits data to the STA1 504 in the period 512a, and transmits data to the STA2 506 in the period 512b. The MAP frame 510a, the sub MAP 510b, and all of the downlink and uplink periods associated therewith, all occur within one transmission frame period 500.

Upon receipt of the data from the AP 502 in the period 512a, the STA1 504 transmits data to the AP 502 in the period 522 of the uplink period 514a indicated by the MAP frame 510a. At this moment, because there is queued data 524 left in the STA1 504, the STA1 504 transmits data in the period 522, together with an RR message for requesting the resources required for transmitting the queued data 524. Upon receipt of the data from the AP 502 in the period 512b, the STA2 506 transmits data to the AP 502 in the period 532 of the uplink period 512a indicated by the MAP frame 510a. The STA2 506 does not transmit an RR message in the period 532, because the period 532 allocated thereto is sufficient to transmit the queued data.

If the AP 502 detects the RR message from the STA1 504 while receiving the data from the STA1 504 and the STA2 506, the AP 502 allocates an additional period 526 appropriate for transmission of the queued data 524 to the STA1 504 through the sub MAP frame 510b. If the AP 502 cannot allocate all the resources required by the RR message in the current transmission frame period, the AP 502 can allocate only the resources available in the current transmission frame period through the sub MAP frame 510b, or allocate all the requested resources through a MAP frame of the next transmission frame period. In the former case where the AP 502 transmits only a part of the requested resources, the remaining resources required by the STA1 504 can be allocated in the next transmission frame period.

If the STA2 506 has no need for additional resource allocation, there is only the period 526 for the STA1 504 in an uplink period 514b following the sub MAP frame 510b. Upon receipt of the sub MAP frame 510b, the STA1 504 transmits the remaining queued data 524 in the period 526 indicated by the sub MAP frame 510b.

Figure 6:
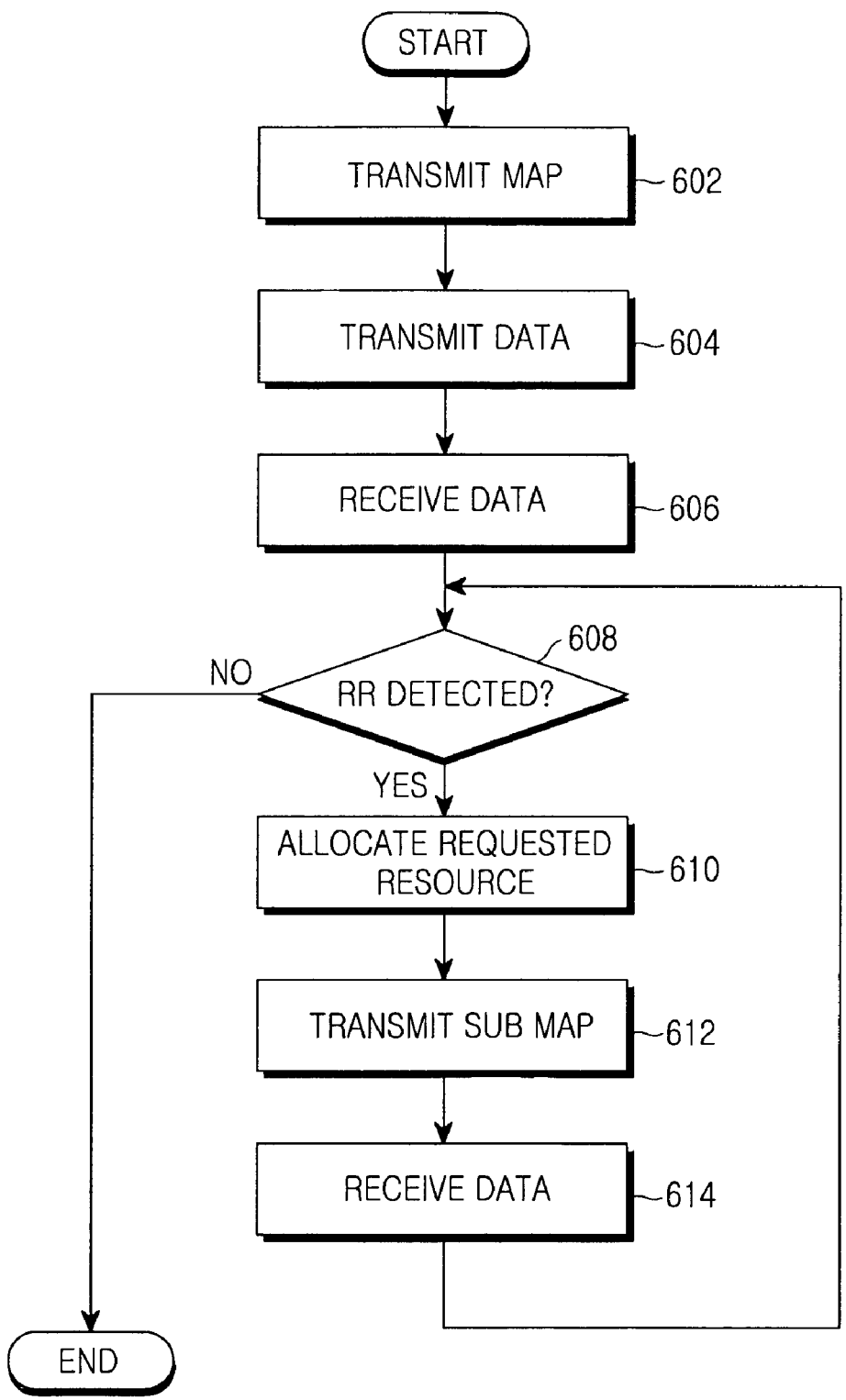
FIG. 6 is a flowchart illustrating an operation of an AP according to the present invention.

FIG. 6 is a flowchart illustrating an operation of an AP according to the present invention.

Referring to FIG. 6, in step 602, the AP transmits a MAP frame indicating a period allocated for the current transmission frame period thereby to initialize the current transmission frame period. In step 604, the AP transmits data downlink data to at least one associated STA in the period indicated by the MAP frame. In step 606, the AP receives uplink data from at least one associated STA in the period indicated by the MAP frame.

In step 608, the AP determines whether the received uplink data includes an RR message requesting additional resource allocation. If no RR message is detected from the uplink data, the AP allocates no more resource in the current transmission frame period, i.e. transmits no sub MAP frame, and proceeds to the next transmission frame period. However, if the RR message is detected, the AP allocates in step 610 the period required by the RR message to the STA that transmitted the RR message. In step 612, after expiration of the full period indicated by the MAP frame, the AP transmits a sub MAP frame indicating the allocated period. In step 614, the AP receives uplink data from the STA in the allocated period.

Figure 7:
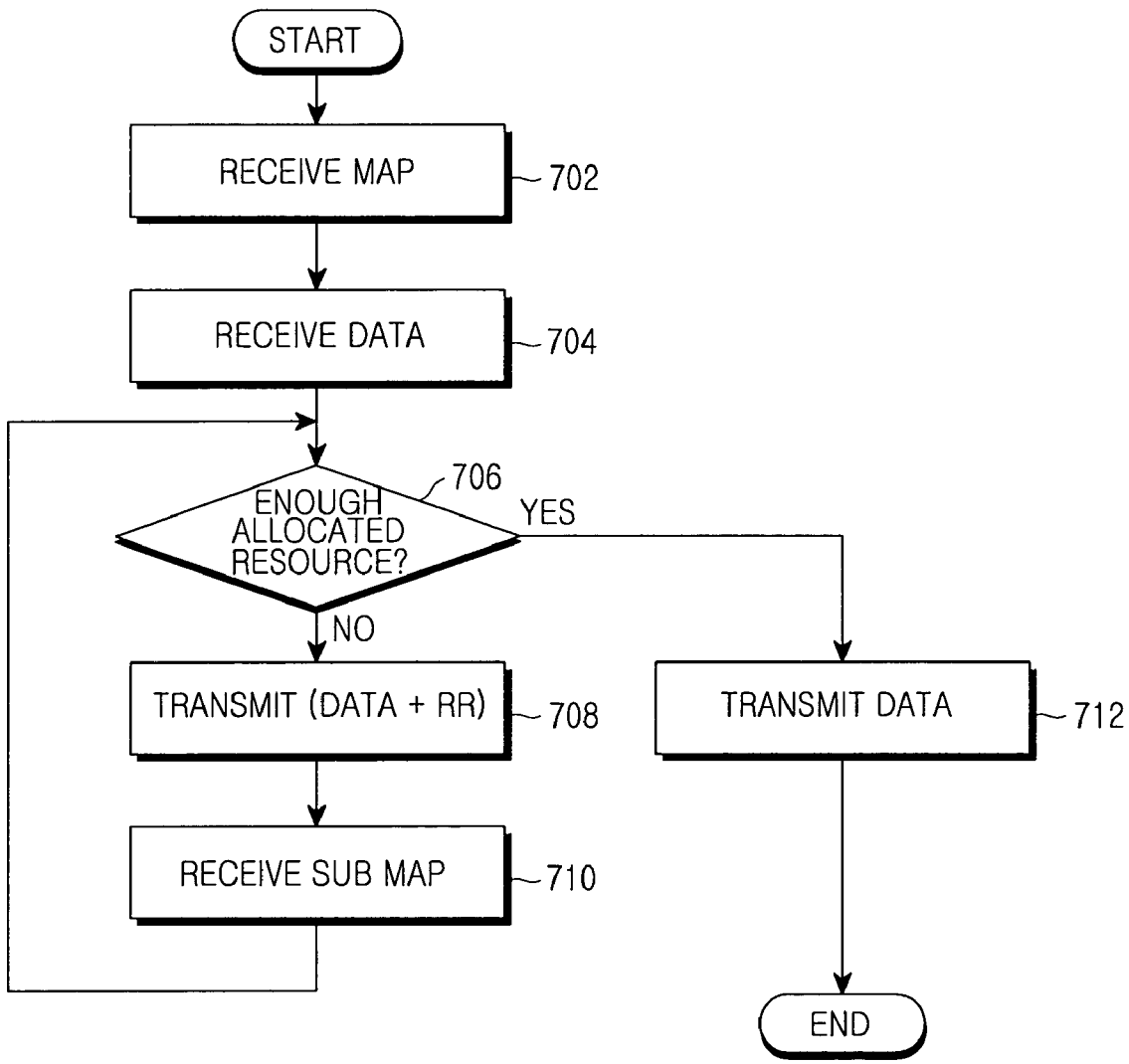
FIG. 7 is a flowchart illustrating an operation of an STA according to the present invention.

FIG. 7 is a flowchart illustrating an operation of an STA according to the present invention.

Referring to FIG. 7, in step 702, the STA, upon receipt of a MAP frame from an AP, recognizes a start of the current transmission frame period and detects a downlink period and/or an uplink period allocated thereto. In step 704, the STA receives downlink data from the AP in the downlink period indicated by the MAP frame.

Before the uplink period indicated by the MAP frame arrives, the STA determines in step 706 whether the uplink period indicated by the MAP frame is sufficient to transmit the queued data. If the uplink period is sufficient, the STA transmits its queued data to the AP in the uplink period indicated by the MAP frame in step 712.

However, if the uplink period is insufficient, the STA transmits a part of the queued data to the AP in the uplink period indicated by the MAP frame, together with an RR message requesting the resources required for transmitting the remaining queued data in step 708. After transmitting the RR message, if the full period indicated by the MAP frame expires, the STA receives a sub MAP frame from the AP in step 710, and then returns to step 706.

As can be understood from the foregoing description, the AP allocates only the minimum resources through the first MAP frame to minimize the overestimated amount of resources, and if the STA has a need for additional resources, the AP immediately allocates the uplink requested resources through the sub MAP frame in the same transmission frame period, thereby removing the QoS reduction cause such as the delay and jitter. In addition, the STA maximizes the sleep mode holding time without unnecessarily monitoring the long period, thereby reducing its power consumption, While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of allocating, by an access point (AP), a transmission period in a frame period in a wireless network system, the method comprising:
    transmitting a first power save multi-poll (PSMP) frame allocating a downlink period and an uplink period to a station (STA), wherein the uplink period is provided to receive queued data from the STA;
    in response to a resource request message from the STA requesting allocation of an additional resource for transmitting at least a portion of remaining queued data of the STA, and after the downlink and uplink periods, transmitting a subsequent PSMP frame allocating an additional uplink period, wherein the subsequent PSMP frame is an additional PSMP frame following the first PSMP frame; and
    receiving the at least a portion of the remaining queued data from the STA during the additional uplink period.

2. The method of claim 1, if the additional uplink period is insufficient for transmitting the remaining queued data, the method further comprises:
    transmitting an additional subsequent PSMP frame allocating an additional uplink period in response to an additional resource request message from the STA; and
    receiving at least an additional portion of the remaining queued data from the STA during the additional uplink period of the additional subsequent PSMP frame.

3. The method of claim 1, wherein the uplink period is provided according to at least one of a required minimum data rate and a period required for transmission of a resource request message.

4. The method of claim 1, wherein the resource request message comprises at least one of a size field defining the amount of the at least a portion of the remaining queued data and a duration request field defining a required quality of service (QoS).

5. The method of claim 1, wherein the subsequent PSMP frame comprises:
    an identifier (ID) of the STA;
    a start offset indicating a start point of the additional uplink period provided by the subsequent PSMP frame; and
    a duration field indicating a duration of the additional uplink period.

6. The method of claim 1, wherein the downlink and uplink periods provided by the PSMP frame and the additional uplink period provided by the subsequent PSMP frame are included in one transmission frame period having a fixed length.

7. The method of claim 2, wherein the transmitting of the additional subsequent PSMP frame to receive the at least an additional portion of the remaining queued data is repeated until all of the queued data is received or a present duration of the frame period expires.

8. A method of allocating, by an access point (AP), a transmission period in a frame period in a wireless network system, the method comprising:
    transmitting a power save multi-poll (PSMP) frame allocating a downlink period and an uplink period to a station (STA), wherein the uplink period is provided to receive queued data from the STA;
    in response to a resource request message from the STA requesting allocation of an additional resource for remaining queued data of the STA, and after the downlink and uplink periods, transmitting a subsequent PSMP frame allocating an additional uplink period, wherein the subsequent PSMP frame is an additional PSMP frame to follow the PSMP frame, in the frame period having a periodic duration; and
    receiving at least a portion of the remaining queued data from the STA during the additional uplink period.

9. The method of claim 8, if the additional uplink period is insufficient for the remaining queued data, the method further comprises:
    transmitting an additional subsequent PSMP frame allocating an additional uplink period in response to an additional resource request message from the STA; and
    receiving at least an additional portion of the remaining queued data from the STA during the additional uplink period of the additional subsequent PSMP frame.

10. The method of claim 8, wherein the uplink period is provided according to at least one of a required minimum data rate and a period required for transmission of a resource request message.

11. The method of claim 8, wherein the resource request message comprises at least one of a size field defining the amount of the at least a portion of the remaining queued data and a duration request field defining a required quality of service (QoS).

12. The method of claim 8, wherein the subsequent PSMP frame comprises:
- an identifier (ID) of the STA;
- a start offset indicating a start point of the additional uplink period provided by the subsequent PSMP frame; and
- a duration field indicating a duration of the additional uplink period.

13. The method of claim 8, wherein the downlink and uplink periods provided by the PSMP frame and the additional uplink period provided by the subsequent PSMP frame are included in one transmission frame period having a fixed length.

14. The method of claim 9, wherein the transmitting of the additional subsequent PSMP frame to receive the at least an additional portion of the remaining queued data is repeated until all of the queued data is received or a present duration of the frame period expires.

15. The method of claim 1, wherein the first PSMP frame comprises:
- an identifier (ID) of the STA;
- a start offset indicating a start point of the downlink and uplink periods provided by the first PSMP frame; and
- a duration field indicating a duration of the downlink and uplink periods provided by the first PSMP frame.

16. The method of claim 8, wherein the PSMP frame comprises:
- an identifier (ID) of the STA;
- a start offset indicating a start point of the downlink and uplink periods provided by the PSMP frame; and
- a duration field indicating a duration of the downlink and uplink periods provided by the first PSMP frame.

17. A method of allocating, by an access point (AP), a transmission period in a frame period in a wireless network system, the method comprising:
- transmitting a power save multi-poll (PSMP) frame allocating a downlink period and an uplink period to each of a plurality of stations (STAs), wherein an associated uplink period is provided to receive queued data from one of the plurality of STAs;
- in response to a resource request message from the one of the plurality of STAs requesting allocation of an additional resource for transmitting at least a portion of remaining queued data of the one of the plurality of STAs, and after its associated downlink and uplink periods, transmitting a subsequent PSMP frame allocating an additional uplink period, wherein the subsequent PSMP frame is an additional PSMP frame following the first PSMP frame; and
- receiving the at least a portion of the remaining queued data from the one of the plurality of STAs during the additional uplink period.

* * * * *